(12) United States Patent
Sieben

(10) Patent No.: US 10,737,758 B2
(45) Date of Patent: Aug. 11, 2020

(54) AIRCRAFT FOR THE TRANSPORT OF PASSENGERS HAVING LOWER DECK FACILITIES

(71) Applicant: Airbus Operations GmbH, Hamburg (DE)

(72) Inventor: Martin Sieben, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 573 days.

(21) Appl. No.: 15/355,257

(22) Filed: Nov. 18, 2016

(65) Prior Publication Data
US 2017/0137109 A1 May 18, 2017

(30) Foreign Application Priority Data

Nov. 18, 2015 (EP) .................................... 15195178

(51) Int. Cl.
*B64C 1/22* (2006.01)
*B64C 1/18* (2006.01)
*B64D 11/00* (2006.01)
*B64C 1/00* (2006.01)

(52) U.S. Cl.
CPC .................. *B64C 1/22* (2013.01); *B64C 1/18* (2013.01); *B64D 11/00* (2013.01); *B64C 2001/0027* (2013.01); *B64D 2011/0076* (2013.01)

(58) Field of Classification Search
CPC .... B64C 2001/0027; B64C 2001/0018; B64C 1/22; B64C 2011/0069; B64C 2011/0076
See application file for complete search history.

(56) References Cited

U.S. PATENT DOCUMENTS

| | | | | |
|---|---|---|---|---|
| 5,992,797 A * | 11/1999 | Seidel | ........................ | B64C 1/00 244/118.5 |
| 6,152,400 A * | 11/2000 | Sankrithi | ................ | B64D 11/00 105/315 |
| 8,534,602 B2 * | 9/2013 | Jakubec | .................. | B64D 11/00 244/118.5 |
| 8,727,277 B2 * | 5/2014 | Guering | .................. | B64D 11/00 244/118.1 |
| 9,403,465 B2 * | 8/2016 | Kircher | ................... | B60N 3/008 |
| 9,896,209 B2 * | 2/2018 | Wartena | .................... | B64D 9/00 |
| 2017/0057637 A1 * | 3/2017 | Cole | ....................... | B64D 11/00 |

FOREIGN PATENT DOCUMENTS

EP 681956 A1 * 7/1998
EP 0 606 920 B1 7/1999

* cited by examiner

*Primary Examiner* — Philip J Bonzell
(74) *Attorney, Agent, or Firm* — Greer, Burns & Crain, Ltd.

(57) ABSTRACT

An aircraft includes a passenger cabin having a floor, a cargo compartment below the floor, a first access unit for accessing the cargo compartment from the passenger cabin, the first access unit being located on the floor and a utility space module arranged in the cargo. At least one part of the cargo compartment includes a first lateral half and a second lateral half in relation to a longitudinal axis of the aircraft; the lateral halves form the part of the cargo compartment. The utility space module includes a utility space cross-section in a direction normal to the longitudinal axis, which is dimensioned such that it conforms to a cross-section of one of the lateral halves of the cargo compartment. Further, the utility space module is placed exclusively in the first lateral half or the second lateral half of the cargo compartment directly below the first access unit.

18 Claims, 4 Drawing Sheets

AIRCRAFT FOR THE TRANSPORT OF PASSENGERS HAVING LOWER DECK FACILITIES

CROSS-REFERENCE TO RELATED APPLICATION

This application claims priority to European Patent Application No. 15195178.7, filed Nov. 18, 2015, which is incorporated herein by reference in its entirety.

TECHNICAL FIELD

The embodiment relates to an aircraft for the transport of passengers and/or cargo having a utility space module in a cargo compartment.

BACKGROUND

Commercial aircraft having a passenger cabin or courier area and a cargo compartment below the passenger cabin may provide lower deck facilities beyond standardized cargo pallets and containers. For example, lower deck galleys, lavatories and crew rest compartments are known. Trolley storage systems including a trolley lift between two decks may be found in modern large commercial aircraft.

The introduction of lower deck facilities leads to the occupation of cargo space, which is then not usable for cargo. Due to design constraints regarding feasible access locations, some fractions of available cargo space may remain completely unused after installing the lower deck facilities.

EP 0 606 920 B1 shows an aircraft fuselage, which is divided by a main deck to form an upper deck and a lower deck, which has its own floor, is interconnected with the upper deck and which comprises supply facilities and sanitary facilities to provide additional seating space on the upper deck.

EP 0 681 956 B1 shows an aircraft having a lower deck with a depressed floor section, which forms an aisle with a sufficient standing height.

SUMMARY

It may be an object of the embodiment to propose an aircraft for the transport of passengers and/or cargo which allows to optimize the size and shape of lower deck facilities, in order to not only gain additional revenue space on a passenger deck, while also reducing the complexity of the cabin for providing an access to lower deck facilities.

This object is met by an aircraft having the features of independent claim 1. Advantageous embodiments and further improvements may be gathered from the sub-claims and the following description.

An aircraft for the transport of passengers and/or cargo is proposed. The aircraft comprises a passenger cabin having a cabin floor, a cargo compartment situated below the cabin floor, a first access unit for accessing the cargo compartment from the passenger cabin, the first access unit being located on the cabin floor and a utility space module arranged in the cargo compartment. At least one part of the cargo compartment comprises a first lateral half and a second lateral half in relation to a longitudinal axis of the aircraft, which lateral halves together form the at least one part of the cargo compartment. The utility space module comprises a utility space cross-section in a direction normal to the longitudinal axis, which utility space cross-section is dimensioned such that it conforms a cross-section of one of the first lateral half and the second lateral half of the cargo compartment. The utility space module is placed exclusively in the first lateral half or the second lateral half of the cargo compartment directly below the access unit.

The passenger cabin may be realized in any suitable form having one, two or more longitudinal aisles and a number of seat rows arranged on the cabin floor along the aisles. Depending on the size of the aircraft, one or more pairs of cabin doors are distributed along the fuselage to allow access from outside the aircraft into the passenger cabin. Further, depending on the number of passenger seats as well as the class layout, a number of additional facilities integrated into one or more cabin monuments are required. These are preferably arranged in at least one door region, which is to be understood as a section of the cabin between two opposite cabin doors, slightly in front of or behind the doors in a longitudinal direction.

Usually, the cargo compartment is created in the lowermost part of the aircraft and often extends from a position just behind a cockpit of the aircraft up to a rearward direction far behind the wing box. The term "cargo compartment" is not necessarily to be understood as a single, large compartment. Instead, the cargo compartment of an aircraft is often divided into at least one forward compartment and several aft compartments. Cargo doors are preferably located at a starboard side of the aircraft.

The first access unit is a device, which may range from a simple hole/cut-out to a ladder or stair house or even an elevator. The first access unit requires a certain opening in the cabin floor, through which objects or persons may enter the desired part of the cargo compartment and, in particular, the utility space module.

As mentioned above, at least a part of the cargo compartment is separated into two lateral halves, wherein a first lateral half may extend on the backboard side of the corresponding part of the cargo compartment and the second lateral half may extend along the starboard side of the corresponding part of the cargo compartment. It is not required that the cargo compartment is physically separated into two lateral halves, it is also sufficient to consider a theoretical separation. The first lateral half and the second lateral halves should be considered completely symmetric, such that both have the same size and are merely mirror-inverted.

A gist of the embodiment lies in providing a lower deck facility in form of the utility space module, which basically has a longitudinal shape arranged on just one side of the cargo compartment. This concept leads to a number of advantages. Due to the fact that the first access unit cannot be located at any completely arbitrary position, the position of the utility space module should be adapted to the location constraints of the first access unit. Since the utility space module comprises a longitudinal shape, which only occupies a fraction of one lateral half of the cargo compartment, the utility space module may be shifted along the longitudinal axis of the aircraft such that it may be placed directly under the first access unit easily.

Further, additional revenue space in the passenger cabin is created through enabling or improving the location of the first access unit. This means that the location of the first access unit does not need to be chosen primarily based on the constraints of the utility space module, but instead may be arranged at or integrated into existing monuments or monument arrangements.

Still further, this significantly reduces an airframe impact if more than one utility space module will be installed, e.g.

using the same first access unit or limiting the airframe impacts by modification of only one cross beam instead of introducing two first access units at different longitudinal positions. The size of the utility space module may be optimized even if the whole remaining space of the cargo compartment should be accessible and usable for cargo containers and pallets.

As common cargo compartments of aircraft allow receiving standardized unit load devices, which may be containers with certain dimensions, the first lateral half and the second lateral half may comprise a cross-section that allows receiving LD1, LD2 or LD3 containers. The cross-section of the utility space module may therefore conform the cross-section of an LD3 container for example. The utility space module may extend over a length that clearly exceeds the length of a common LD1, LD2 or LD3 container. It may extend along the length of up to two, three, four, five, six or even more of these containers as well as all reasonable increments.

In an advantageous embodiment, the utility space module comprises at least one access opening, which is aligned with the first access unit. For accessing the utility space module, an upper side of the utility space module may be completely open or may be covered by one or a plurality of cover plates, wherein, depending on the length and design of the utility space module, it may comprise at least one access opening. The access opening allows an access from the first access unit into the utility space module, be it through stairs, a ladder, an elevator or any other device.

The passenger cabin may comprise two aisles arranged parallel to the longitudinal axis and at a distance to each other. This is common in wider aircraft having, for example between two and eleven seats abreast in the cabin. The resultant lateral extension of the utility space module is rather large, such that the utility space module is usable by persons. Also, in such a passenger cabin, a first access unit may be arranged between the two aisles or in a region adjacent to a centre arrangement between the two aisles, providing a sufficient height to stand or walk into in an upright manner.

It may be advantageous if the first access unit is aligned with one of the two aisles in a lateral direction of the passenger cabin. In this lateral position, a sufficient standing height is given, while in lateral positions further outward the available vertical space decreases.

It is preferred to place the first access unit in a door region of the passenger cabin. In general, a section of the cabin floor between two opposite cabin doors up to forward and rearward adjacent passenger seats is referred to as the door area. This section is dimensioned based on the overall size of the passenger cabin and requirements of the aircraft operator.

The cabin floor may comprise at least one dedicated monument zone comprising an aircraft adaptation consisting for example either in increased structural stability or system connections, which at least one monument zone is equipped with at least one cabin monument, wherein the access unit is placed in the at least one dedicated monument zone. The at least one dedicated monument zone may comprise an increased structural stability. Since large and distinctly integrated cabin monuments comprise a higher weight per area than passenger seats, often these so-called monument zones with a structurally reinforced cabin floor are used. As the utility space module allows a rather simple adaption to a given position of the first access unit, it is preferred to install the first access unit in the monument zone.

It is also preferred that the first access unit is attached to or integrated into the at least one cabin monument. In case larger cabin monuments are used that extend over substantially the whole lateral installation space, the first access unit may be realized as one of many modules installed in the monument. Also, it may be arranged adjacent to such a cabin monument, i.e. in front of or behind the monument.

In another advantageous embodiment, the access unit comprises a housing having an access door. Thus, inadvertent access of non-authorized persons can be prevented. Further, accidents due to an open access opening in the cabin floor can be prevented.

As stated before, the first access unit comprises at least one of the stairs, an elevator and a ladder. The elevator and the stairs may be installed in cases where installation space and weight is less of an issue than in smaller aircraft. A most simple solution for providing the first access unit is by simply installing a ladder, which has clear advantages regarding the weight and installation costs.

Particularly for a long haul aircraft, the utility space module may comprise at least one crew rest compartment. Such a crew rest compartment may comprise at least one bed arranged at an outer lateral wall of the at least one crew rest compartment. In a cargo compartment, the available installation height decreases in a lateral outboard direction, which particularly allows the integration of a bed where no standing height is required. At a further inboard direction, a narrow aisle may be integrated to gain access to the first access unit and the at least one bed.

It is particularly advantageous if the utility space module is located in a lateral half of the cargo compartment, which is opposite to a cargo door. By this setup, full access to all remaining cargo compartment positions is possible, be it in the same lateral half as the utility space module or the other, free half.

As a cargo door is preferably installed in a starboard side at either the most forward location of the forward cargo compartment or the most aft location of the aft cargo compartment, the utility space module is preferably located in a backboard half of the forward cargo compartment or the forward half of the aft cargo compartment.

In analogy to the aircraft defined above, the embodiment further relates to the use of exclusively one of a first lateral half and a second lateral half of a cargo compartment of an aircraft in relation to a longitudinal axis of the aircraft, which lateral halves together form the at least one part of the cargo compartment, for receiving a utility space module in the cargo compartment directly below an access unit arranged in a passenger cabin of the aircraft, wherein the utility space module comprises a utility space cross-section in a direction normal to a longitudinal axis of the aircraft, which utility space cross section is dimensioned such that it conforms a cross-section of one of the first lateral half and the second lateral half of the cargo compartment.

In addition, other objects, desirable features and characteristics will become apparent from the following detailed description and the appended claims, taken in conjunction with the accompanying drawings.

BRIEF DESCRIPTION OF THE DRAWINGS

Further characteristics, advantages and application options of the present embodiment are disclosed in the following description of the exemplary embodiments in the figures. All the described and/or illustrated characteristics per se and in any combination form the subject of the embodiment, even irrespective of their composition in the individual claims or their interrelationships. Furthermore, identical or similar components in the figures have the same reference characters.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
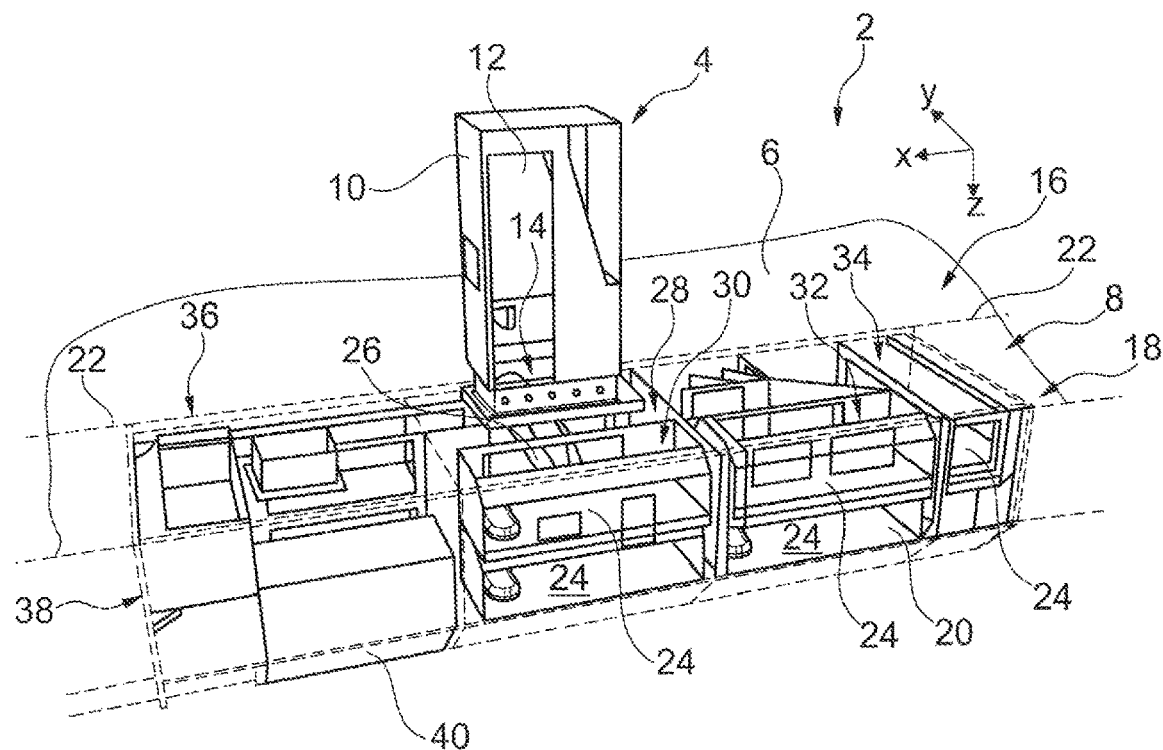
FIG. 1 shows a utility space module in a cargo compartment and a first access unit in a cabin of an aircraft in a three-dimensional view.

FIG. 1 shows a section of an aircraft showing a part of a passenger cabin 2 with a first access unit 4 arranged on a cabin floor 6, underneath of which a cargo compartment 8 is located. The first access unit 4 comprises a housing 10 with an access opening 12 closable by a door (not shown). Inside the housing 10, a horizontal access opening 14 reaching through the cabin floor 6 is present, through which the cargo compartment 8 may be reached by a person.

The cargo compartment 8 is separated into a first lateral half 16 and a second lateral half 18, wherein in the second lateral half 18, a utility space module 20 is located. The separation into the first and second lateral half 16 and 18 is created along a longitudinal axis 22, such that both lateral halves 16 and 18 comprise the same width.

In the depicted exemplary embodiment, the utility space module 20 has a longitudinal shape and comprises a crew rest compartment with several beds 24 arranged at a rearward portion, at a front portion and at lateral outboard portions of the utility space module 20. Access from the first access unit 4 is provided by means of a ladder 26 or stairs, through which an aisle 28 can be reached, which in turn allows access to the beds 24 placed in several sub-compartments 30, 32 and 34.

A lateral wall 36 located near the longitudinal axis 22 comprises a greater height than a more outboard located lateral wall 38, which adjoins an angled lateral wall 40 at a lower portion of the utility space module 20. The cross-sectional profile created by this design conforms the cross-sectional profile e.g. of an LD3 container and thus allows the integration into a common cargo compartment 8.

The utility space module 20 is preferably fixedly installed in the cargo compartment 8 using common installation equipment. Due to the longitudinal shape of the utility space module 20, the actual installation position is shiftable along the x-axis of the aircraft basically arbitrarily, depending on the available length of the cargo compartment 8. Hence, the location of the first access unit 4, which has to be chosen according to several constraints within the passenger cabin 2, may easily be adapted.

The aircraft fixed coordinate system shown in all figures indicates an x-direction, i.e. a longitudinal axis in the direction of flight, an y-axis, i.e. a lateral direction, as well as a z-axis, i.e. a vertical direction pointing downward.

Figure 2:
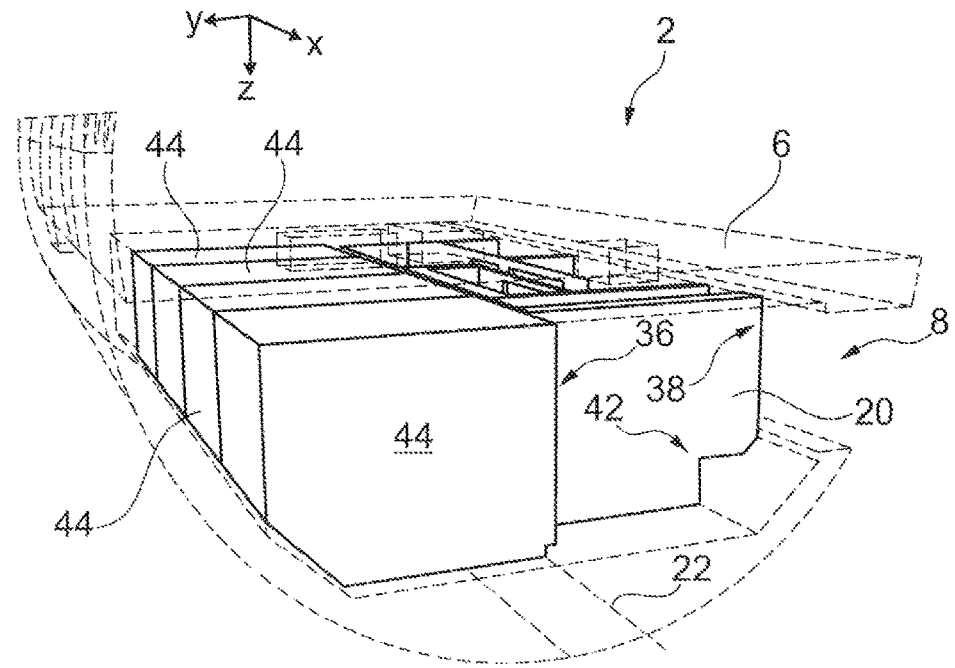
FIG. 2 shows the utility space module and cargo containers in two different lateral halves of the cargo compartment.

FIG. 2 shows the integration of the utility space module 20 from a different angle. Here, the cross-sectional profile of the utility space module 20 given through the lateral walls 36 and 38 is more clearly shown. Exemplarily, a lower portion of the utility space module 20 at an outboard position comprises a step 42 instead of an angled surface 40 shown in FIG. 1. The actual design may differ in a variety of ways as the only requirement is to fit into the cargo compartment 8.

It is clear from the illustration in FIG. 2 that the utility space module 20 is exemplarily located in a backboard half of the cargo compartment 8, while the starboard half holds a row of several common cargo containers 44. These are introduced into the cargo compartment by a cargo door (not shown), which is located at the starboard half.

Figure 3:
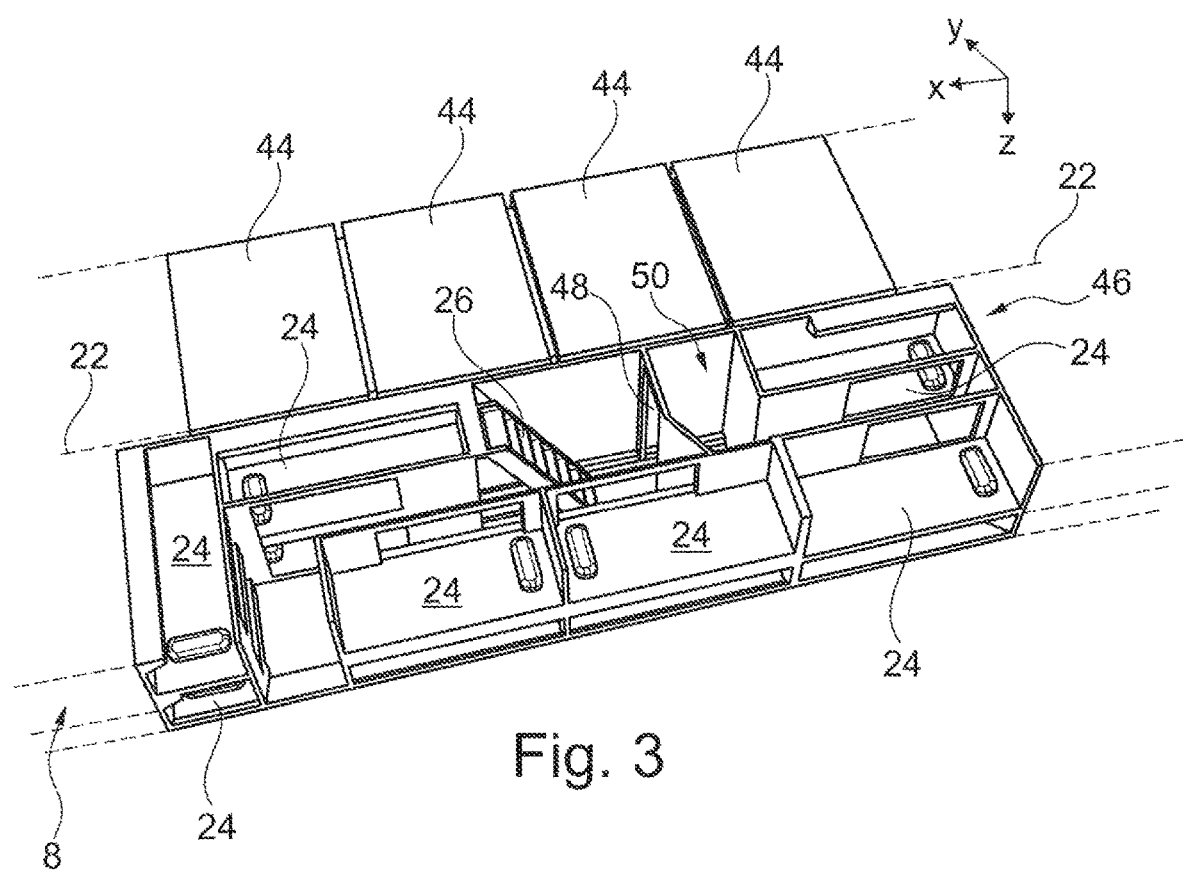
FIG. 3 shows an elevated view without any airframe structure of the cargo containers and the utility space module, exemplarily a crew rest compartment, without a top cover.

In FIG. 3, another exemplary embodiment of a utility space module 46 is demonstrated. Here, a possible setup of ten beds 24 is demonstrated. The interior of the utility space module 46 exemplarily comprises a separate access opening 48 just in front of a ladder 26 (or simple stairs) allows access to a separate closable sleeping compartment 50, which may exemplarily be used for a flight crew. In this example, the utility space module 46 has a length that exceeds the length of four common cargo containers arranged one behind the other in the starboard half of the cargo compartment 8.

Figure 4:
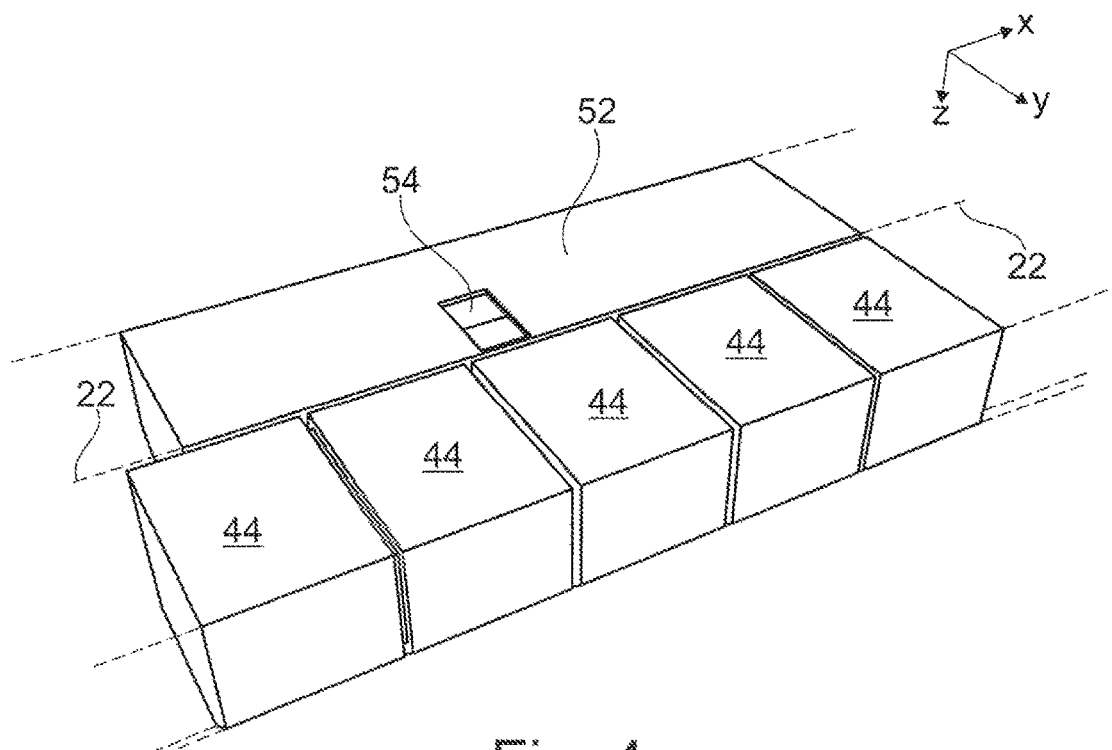
FIG. 4 shows the arrangement of FIG. 3 from another angle and with a top cover arranged on the utility space module, exemplarily a trolley stowage system.

In FIG. 4, the utility space module 46 is shown together with a row of cargo containers 44, wherein a cover 52 is disposed on top of the utility space module 46. The cover 52 may comprise at least one cover plate attached to the utility space module 46 and comprises an access opening 54, which is flush with the access opening 14 of the first access unit 4, when the utility space module 46 is installed at a predetermined location.

Figure 5:
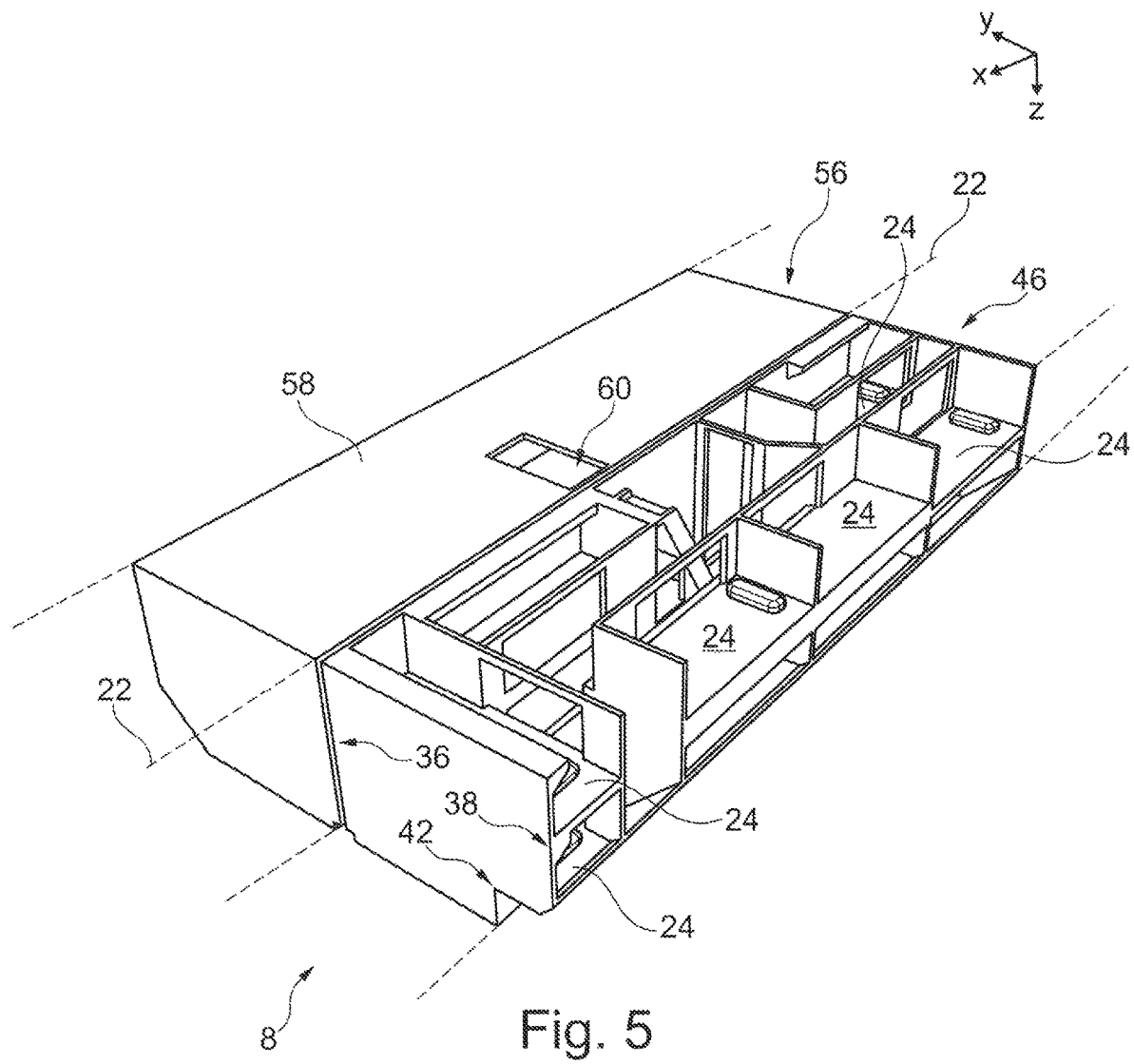
FIG. 5 shows the utility space module and a further module in two different lateral halves of the cargo compartment.

In FIG. 5, another combination is shown. Here, the utility space module 46 may be arranged adjacent to a second utility space module 56, which may also house a crew rest compartment or an automated trolley storage system, which may be combined with a waste management system (not shown). For simplifying the illustration of an arbitrarily designed second utility space module 56 it is shown as a block having a cover 58 including an access opening 60.

Figure 6:
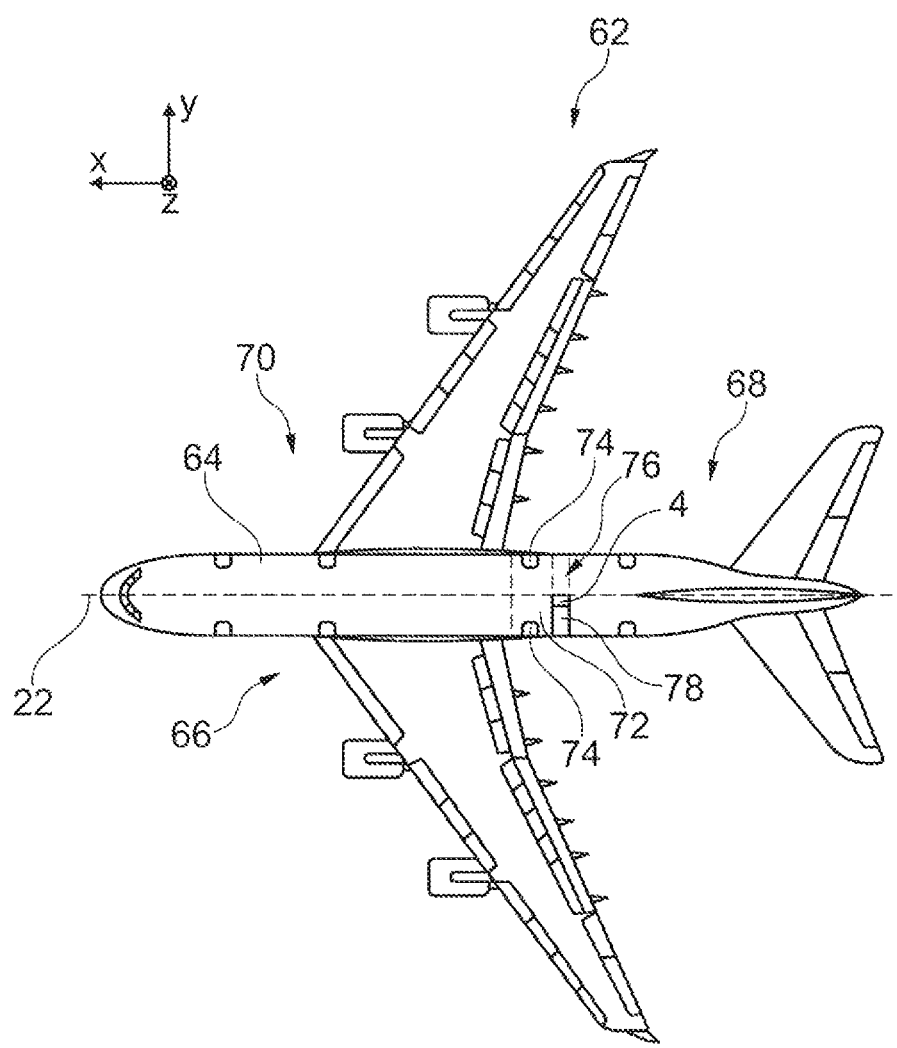
FIG. 6 shows an aircraft comprising a cabin and a cargo compartment receiving the utility space module.

Finally, FIG. 6 shows an aircraft 62 exemplarily having a passenger cabin 64 with two decks arranged on top of each other as well as a cargo compartment 66 underneath the passenger cabin 64, which receives a utility space module according to the above description. The aircraft 62 exemplarily comprises at least two cargo doors 68 and 70 arranged at a starboard side, while the utility space module as discussed above may exemplarily be arranged at a backboard side. An exemplary door area 72 between two opposite cabin doors 74 is indicated. Here, a monument zone 76 may be arranged at a border of the door zone 72 for installing cabin monuments 78 as well as the first access unit 4.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aircraft for the transport of passengers and/or cargo, the aircraft comprising:
    a passenger cabin having a cabin floor;
    a cargo compartment situated below the cabin floor;
    a access unit to access the cargo compartment from the passenger cabin, the access unit being located on the cabin floor, wherein the access unit comprises a housing situated in the passenger cabin and enclosing a housing space over the cabin floor, wherein the access unit comprises a floor opening in the cabin floor under the housing space for access to the cargo compartment from the housing space, and wherein the housing is formed with a housing opening for access to the housing space from the passenger cabin;
    a utility space module arranged in the cargo compartment;
    wherein at least one part of the cargo compartment comprises a first lateral half and a second lateral half in relation to a longitudinal axis of the aircraft, which lateral halves together form the at least one part of the cargo compartment;
    wherein the utility space module comprises a utility space cross-section in a direction normal to the longitudinal axis, which utility space cross section is dimensioned such that it conforms to a cross-section of the first lateral half of the cargo compartment;
    wherein the utility space module is located exclusively in the first lateral half of the cargo compartment directly below the access unit;
    wherein the passenger cabin comprises a first lateral cabin half directly over the first lateral half of the cargo compartment;
    wherein the passenger cabin comprises a second lateral cabin half directly over the second lateral half of the cargo compartment;
    wherein the access unit is located exclusively in the first lateral cabin hall,
    wherein the access unit comprises at least one of a stairs, an elevator and a ladder,
    wherein the utility space module comprises at least one crew rest compartment, and a wall formed with a closable access opening and located between the at least one crew rest compartment and the at least one of the stairs, the elevator and the ladder,
    wherein the at least one crew rest compartment is a first crew rest compartment, wherein the first crew rest compartment includes a bed, wherein the aircraft further comprises a second crew rest compartment including a bed, and
    wherein the first crew rest compartment is longitudinally spaced from the second crew rest compartment such that the at least one of the stairs, the elevator and the ladder is located therebetween.

2. The aircraft of claim 1, wherein the utility space module comprises a cover plate enclosing an upper end of the utility space module, wherein the cover plate is located below the cabin floor, and wherein the cover plate is formed with at least one access opening aligned with the floor opening of the access unit.

3. The aircraft of claim 1, wherein the access unit is arranged in a door region of the passenger cabin.

4. The aircraft of claim 1, wherein the access unit comprises a housing having an access door.

5. The aircraft of claim 1, wherein the at least one crew rest compartment comprises at least one bed arranged at an outer lateral wall of the at least one crew rest compartment.

6. The aircraft of claim 1, wherein the wall formed with the closable access opening is located between the first crew rest compartment and the second crew rest compartment.

7. The aircraft of claim 1, wherein the utility space module is located in a backboard half of the cargo compartment.

8. The aircraft of claim 1, wherein the at least one cabin monument is located exclusively in the first lateral cabin half.

9. The aircraft of claim 1, wherein access unit comprises an elevator.

10. The aircraft of claim 9 wherein the housing comprises an access door to selectively prevent access through the housing opening.

11. The aircraft of claim 1, wherein:
    the cabin floor comprises at least one dedicated monument zone equipped with at least one cabin monument; and
    the access unit is located in the at least one dedicated monument zone.

12. The aircraft of claim 11, wherein the access unit is attached to or integrated into the at least one cabin monument.

13. The aircraft of claim 1, wherein:
    the cabin floor comprises a dedicated monument zone and a passenger seat zone, wherein the cabin floor has a higher weight per area in the dedicated monument zone than in the passenger seat zone;
    the dedicated monument zone is equipped with a cabin monument, wherein the cabin monument is located exclusively in the first lateral cabin half;
    the access unit is located in the dedicated monument zone; and
    the access unit is attached to or integrated into the cabin monument.

14. The aircraft of claim 13, wherein the access unit is located between the cabin monument and the longitudinal axis of the aircraft.

15. A method of transporting passengers in an aircraft, the method comprising:
    defining a first lateral half and a second lateral half of an aircraft in relation to a longitudinal axis of the aircraft,
    locating an access unit in a passenger cabin of the aircraft, wherein the access unit comprises a housing situated in the passenger cabin and enclosing a housing space over a cabin floor, wherein the access unit comprises a floor opening in the cabin floor under the housing space for access to a cargo compartment from the housing space, and wherein the housing is formed with a housing opening for access to the housing space from the passenger cabin, wherein the access unit is exclusively in the first lateral half of the aircraft, and
    receiving a utility space module in a cargo compartment of the aircraft and directly below the access unit in the passenger cabin of the aircraft, wherein the utility space module is exclusively received in the first lateral half of the aircraft, wherein the utility space module comprises a utility space cross-section in a direction normal to the longitudinal axis of the aircraft and dimensioned such that the utility space cross section conforms with a cross-section of the cargo compartment in the first lateral half of the aircraft, wherein the access unit comprises at least one of a stairs, an elevator and a ladder, wherein the utility space module comprises at least one crew rest compartment, and a wall formed with a closable access opening and located between the at least one crew rest compartment and the at least one of the stairs, the elevator and the ladder, wherein the at least one crew rest compartment is a first crew rest compartment, wherein the first crew rest compartment includes a bed, wherein the aircraft further comprises a second crew rest compartment including a bed, and wherein the first crew rest compartment is longitudinally spaced from the second crew rest compartment such that the at least one of the stairs, the elevator and the ladder is located therebetween.

16. The method of claim 15 wherein the utility space module comprises a cover plate enclosing an upper end of the utility space module, wherein the cover plate is formed with at least one access opening, and wherein the method further comprises aligning the access opening in the cover plate with the floor opening of the access unit.

17. The method of claim 15 wherein the housing comprises an access door to selectively prevent access through the housing opening.

18. The method of claim 15 wherein the access unit comprises an elevator.

* * * * *